(12) United States Patent
Lockwood et al.

(10) Patent No.: US 12,159,736 B2
(45) Date of Patent: Dec. 3, 2024

(54) SYSTEMS AND DEVICES FOR STRAIN RELIEF FOR MAGNETIC CORES AND ASSEMBLIES

(71) Applicant: Waymo LLC, Mountain View, CA (US)

(72) Inventors: Robert Lockwood, Mountain View, CA (US); Kelvin Kwong, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1039 days.

(21) Appl. No.: 17/107,950

(22) Filed: Nov. 30, 2020

(65) Prior Publication Data
US 2022/0172873 A1     Jun. 2, 2022

(51) Int. Cl.
| | |
|---|---|
| *H01F 27/06* | (2006.01) |
| *G01S 7/481* | (2006.01) |
| *H01F 27/24* | (2006.01) |
| *H01F 27/26* | (2006.01) |
| *H01F 27/30* | (2006.01) |
| *H01F 38/18* | (2006.01) |

(52) U.S. Cl.
CPC ............ *H01F 27/06* (2013.01); *G01S 7/4813* (2013.01); *H01F 27/24* (2013.01); *H01F 27/266* (2013.01); *H01F 27/306* (2013.01); *H01F 38/18* (2013.01)

(58) Field of Classification Search
CPC ........ H01F 27/06; H01F 27/24; H01F 27/266; H01F 27/306; H01F 38/18; G01S 7/4813; G01S 7/4817; G01S 17/06
See application file for complete search history.

(56) References Cited

U.S. PATENT DOCUMENTS

| | | | |
|---|---|---|---|
| 5,126,906 A | 6/1992 | Ohji et al. | |
| 5,412,366 A * | 5/1995 | Ohji | H01F 38/18 336/200 |
| 6,388,548 B1 * | 5/2002 | Saito | H01F 38/18 336/131 |
| 7,187,823 B2 | 3/2007 | Dimsdale et al. | |

(Continued)

FOREIGN PATENT DOCUMENTS

| | | | |
|---|---|---|---|
| FR | 1262099 A | 5/1961 | |
| GB | 600605 A | 4/1948 | |

OTHER PUBLICATIONS

Tsun-Hsu Chang, "Ferrite Materials and Applications", IntechOpen, 2019.

*Primary Examiner* — Steven L Yeninas
(74) *Attorney, Agent, or Firm* — McDonnell Boehnen Hulbert & Berghoff LLP

(57) ABSTRACT

An example device includes a mounting structure including a first material having a first coefficient of thermal expansion (CTE). The mounting structure includes a center portion and an outer portion. The device further includes a magnetic core for an electrical component that is coupled to the outer portion of the mounting structure. The magnetic core includes a second material having a second CTE. The magnetic core is split into a plurality of sections separated by spaces extending from the center portion to an outer edge of the outer portion. Each of the plurality of sections is separately coupled to the mounting structure, and each of the plurality of sections is connected to the electrical component.

20 Claims, 15 Drawing Sheets

(56) References Cited

U.S. PATENT DOCUMENTS

| | | |
|---|---|---|
| 7,352,929 B2 | 4/2008 | Hagen et al. |
| 9,136,912 B2 | 9/2015 | West et al. |
| 10,277,084 B1 * | 4/2019 | Karplus ............... H02K 1/22 |
| 10,481,269 B2 | 11/2019 | Pacala et al. |
| 10,491,052 B2 | 11/2019 | Lenius et al. |
| 2013/0241367 A1 * | 9/2013 | Taniguchi ............ H02K 7/003 |
| | | 310/68 D |
| 2016/0181013 A1 | 6/2016 | Herrmann |
| 2019/0011285 A1 | 1/2019 | Utermoehlen et al. |
| 2019/0179028 A1 * | 6/2019 | Pacala ............... H05K 1/0274 |
| 2020/0119687 A1 * | 4/2020 | Yu ..................... H01F 27/346 |
| 2020/0166589 A1 | 5/2020 | Karplus et al. |
| 2020/0350109 A1 * | 11/2020 | Dubois ............... H01F 27/28 |
| 2022/0077756 A1 * | 3/2022 | Hata .................. H01F 38/14 |
| 2022/0130604 A1 * | 4/2022 | You ................... H01F 27/025 |

\* cited by examiner

1000

```
                    ┌─────────────────────────────────────────────┐
                    │ PROVIDING A MOUNTING STRUCTURE COMPRISING A FIRST │
                    │ MATERIAL HAVING A FIRST COEFFICIENT OF THERMAL    │─ 1002
                    │ EXPANSION (CTE), WHEREIN THE MOUNTING STRUCTURE   │
                    │ COMPRISES AN INNER PORTION AND AN OUTER PORTION   │
                    └─────────────────────────────────────────────┘
                                          │
                                          ▼
                    ┌─────────────────────────────────────────────┐
                    │ COUPLING A MAGNETIC CORE FOR AN ELECTRICAL        │
                    │ COMPONENT TO THE OUTER PORTION OF THE MOUNTING    │─ 1004
                    │ STRUCTURE, THE MAGNETIC CORE COMPRISING A SECOND  │
                    │ MATERIAL HAVING A SECOND CTE, WHEREIN THE MAGNETIC│
                    │ CORE IS SPLIT INTO A PLURALITY OF SECTIONS SEPARATED BY │
                    │ SPACES EXTENDING FROM THE CENTER PORTION TO AN    │
                    │ OUTER EDGE OF THE OUTER PORTION, WHEREIN EACH OF THE │
                    │ PLURALITY OF SECTIONS IS SEPARATELY COUPLED TO THE │
                    │ MOUNTING STRUCTURE, AND WHEREIN EACH OF THE       │
                    │ PLURALITY OF SECTIONS IS CONNECTED TO THE ELECTRICAL │
                    │ COMPONENT                                         │
                    └─────────────────────────────────────────────┘
```

FIGURE 10

SYSTEMS AND DEVICES FOR STRAIN RELIEF FOR MAGNETIC CORES AND ASSEMBLIES

BACKGROUND

Unless otherwise indicated herein, the materials described in this section are not prior art to the claims in this application and are not admitted to be prior art by inclusion in this section.

A device having rotating components, such as a gyroscopic sensing module or a Light Detection and Ranging (LIDAR) device may include a stationary end and a rotating end which are separated by a space. A transformer may be used to transfer power and/or data between the stationary end and the rotating end. Some transformers often include brittle materials, such as ferrite materials, that are prone to breaking or chipping in response to an applied strain. Differences in thermal expansion properties between the transformer and a surface on which it is mounted may be a source of such strain experienced by the transformer when the device encounters a change in thermal conditions.

SUMMARY

In a first example, a device is described. The device includes a mounting structure including a first material having a first coefficient of thermal expansion (CTE). The mounting structure includes a center portion and an outer portion. The device further includes a magnetic core for an electrical component that is coupled to the outer portion of the mounting structure. The magnetic core includes a second material having a second CTE. The magnetic core is split into a plurality of sections separated by spaces extending from the center portion to an outer edge of the outer portion. Each of the plurality of sections is separately coupled to the mounting structure, and each of the plurality of sections is connected to the electrical component.

In a second example, a light ranging and detection (LIDAR) device is described. The LIDAR device includes a first end having a first side of a transformer pair. The first side of the transformer pair is configured to transfer power to a second side of the transformer pair. The LIDAR device includes a second end. The second end includes a plurality of a plurality of light emitters, a plurality of light detectors, and a second side of the transformer pair. The second side of the transformer pair is configured to power the plurality of light emitters and the plurality of light detectors by way of the first side of the transformer pair. The first side of the transformer pair and the second side of the transformer pair each includes a plurality of a mounting structure including a first material having a first coefficient of thermal expansion (CTE). The mounting structure includes a center portion and an outer portion, and a magnetic core for an electrical component that is coupled to the outer portion of the mounting structure. The magnetic core includes a second material having a second CTE. The magnetic core is split into a plurality of sections separated by spaces extending from the center portion to an outer edge of the outer portion. Each of the plurality of sections is separately coupled to the mounting structure, and each of the plurality of sections is connected to the electrical component.

In a third example, a transformer is described. The transformer includes a first side of a transformer pair and a second side of the transformer pair. The first side is configured to transfer power to the second side, and the first side of the transformer pair and the second side of the transformer pair each include a mounting structure comprising a first material having a first coefficient of thermal expansion (CTE). The mounting structure comprises a center portion and an outer portion. The first side of the transformer pair and the second side of the transformer pair each include a magnetic core that is coupled to the outer portion of the mounting structure, the magnetic core comprising a second material having a second CTE, wherein the magnetic core is split into a plurality of sections separated by spaces extending from the center portion to an outer edge of the outer portion, wherein each of the plurality of sections is separately coupled to the mounting structure, and wherein each of the plurality of sections is connected to the electrical component. The first side of the transformer pair and the second side of the transformer pair each include a winding connected to the magnetic core.

BRIEF DESCRIPTION OF THE FIGURES

FIG. 10 illustrates a block diagram of a method, according to an example embodiment.

DETAILED DESCRIPTION

Figure 1:
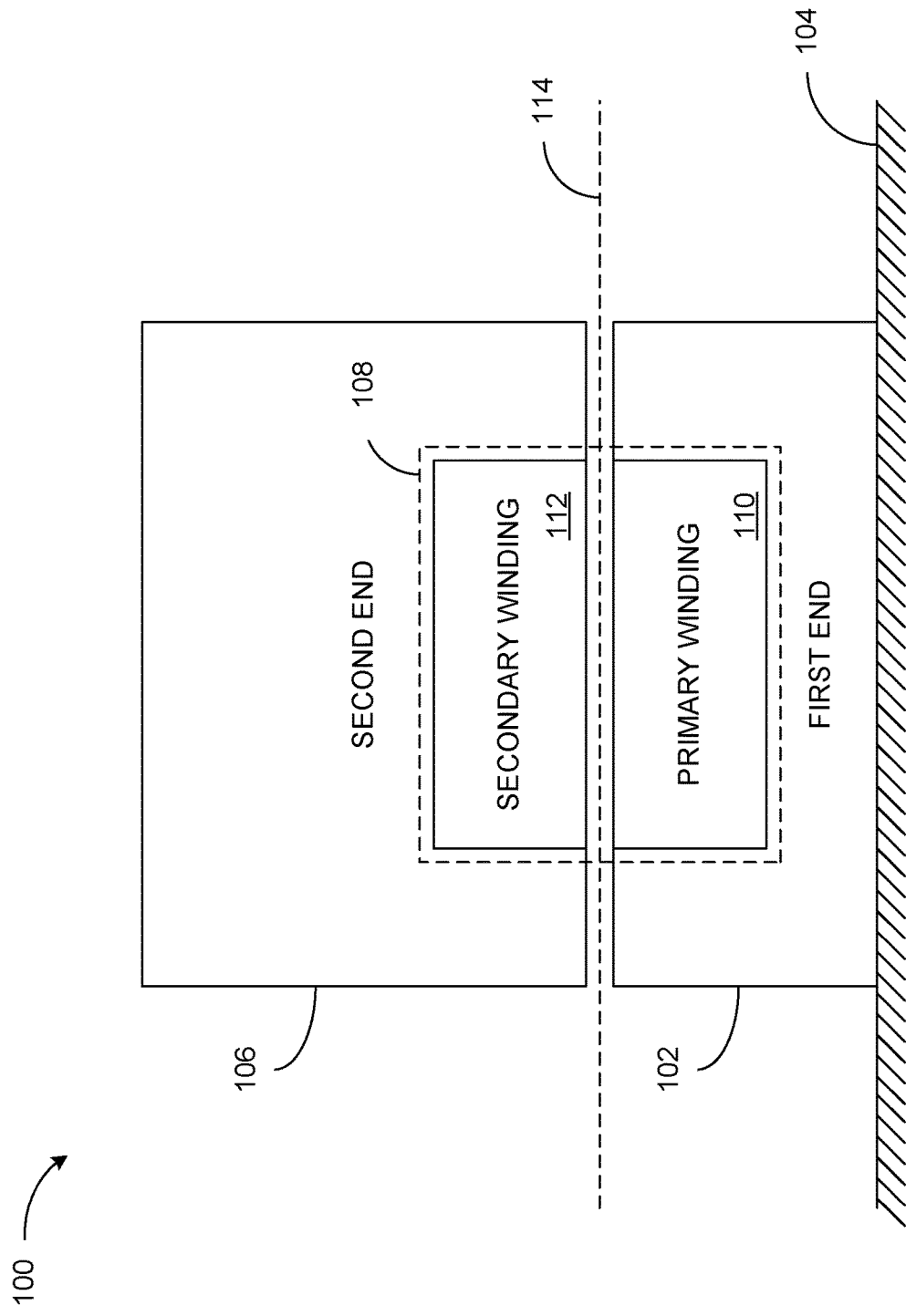
FIG. 1 is a block diagram of a device, according to an example embodiment.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

A device having rotating components, such as a gyroscopic sensing module or a LIDAR device, may wirelessly transmit data and/or power from a stationary portion of the device to a rotating portion. This wireless transmission may be accomplished using a transformer having a magnetic core (e.g., a ferrite core). Modulating a signal across the transformer allows for data and/or power to travel wirelessly to and from components on the rotating portion.

The magnetic core can be mounted to a relatively stationary portion of a system. For example, in the context of a LIDAR device, the magnetic core can be mounted to a structure on the LIDAR device or on a structure to which the LIDAR device is attached, such as a vehicle. The mounting structure can be an aluminum structure, or a structure made up of one or more additional or alternative materials (e.g., a metal). Because the magnetic core is mounted in a stationary manner relative to the mounting structure, the magnetic core can be exposed to mechanical forces whenever the mounting structure expands or contracts in response to a change in thermal conditions. In particular, this may result from different coefficients of thermal expansion (CTEs) between the magnetic core and the mounting structure. In some contexts, this may result in overstraining or breaking the magnetic core. Further, pieces of the magnetic core that break off in response to changes in thermal conditions may obstruct movement of the device.

In an example embodiment, the device includes a magnetic core and an electrical component (e.g., one or more windings of a transformer) that is coupled to the magnetic core. The magnetic core may be split into a plurality of sections separated by spaces extending from a center portion of the mounting structure to an outer edge of the outer portion of the mounting structure. Each of the plurality of sections is separately coupled to the mounting structure, which may allow for the sections to move relative to one another as the magnetic core expands or contracts in response to thermal conditions. Further, each of the sections is connected to the electrical component. In this manner, the strain experienced by the magnetic core can be reduced while still providing structure to the device.

In an example embodiment, during first thermal conditions, the plurality of sections are separated by a first distance and, during second thermal conditions, the plurality of sections are separated by a second distance that is different from the first distance. For example, the first thermal conditions may correspond to room temperature at which each section may be separated by a first distance and the second thermal conditions may have a higher temperature (e.g., 100° F.). Because the magnetic core may have a lower CTE than the mounting structure, the sections of the magnetic core may expand at a lower rate than the mounting structure. This may cause the sections to be separated by a second distance in the second thermal conditions that is greater than the first distance in the first thermal conditions.

In an example embodiment, the device is a device (e.g., a LIDAR device, a gyroscopic sensor device, an inertial measurement unit (IMU) device, or another device) having a stationary portion and a rotating portion. In these examples, the electrical component is a primary or secondary winding of a transformer that is coupled to the stationary portion of the device. The winding may be coupled to the magnetic core. Though examples herein may describe a LIDAR device, other types of devices such as gyroscopic sensors or IMUs are contemplated.

In an example embodiment, the rotating portion of the LIDAR device may have a first magnetic core corresponding to a primary winding of the transformer and the stationary portion of the LIDAR device may have a second magnetic core corresponding to a secondary winding of a transformer. Each magnetic core may include sections that are aligned with a center point that corresponds to an axis of rotation of a rotating portion of the LIDAR device. This may allow both ends of the transformer to remain aligned in changing thermal conditions and thereby continue transmitting power and/or data across a space separating the primary winding and the secondary winding in changing thermal conditions.

Even with reduced strains experienced by the magnetic core due to splitting the magnetic core into multiple sections, the magnetic core may chip or have pieces break off. In the context of a LIDAR device this may obstruct movement of the rotating portion. Within examples, an intermediate film may be disposed between the mounting structure and the magnetic core of the electrical component to contain any broken pieces of the magnetic core.

II. Example Systems

FIG. 1 is a block diagram of a device 100, according to an example embodiment. In particular, FIG. 1 shows device 100 having a first end 102 that is coupled to a stationary surface 104, and a second end 106 that is movable (e.g., rotatable) relative to the stationary surface 104. In this context, stationary is referred to relative to device 100.

The device 100 further includes a transformer 108 that spans a space 114 (e.g., an air gap) separating the first end 102 and second end 106. Transformer 108 includes a primary winding 110 disposed on the first end 102 and a secondary winding 112 disposed on the second end 106. Though not illustrated in FIG. 1, each winding may correspond to a separate magnetic core.

Transformer 108 may include a transformer pair having a first side corresponding to primary winding 110 and a second side corresponding to secondary winding 112. Transformer 108 can be used to transfer power and/or data from the primary winding 110 in the first end 102 to the secondary winding 112 in the second end 106 in accordance with a modulation scheme. In turn, the secondary winding 112 may transfer the power and/or data to one or more components of the device 100. Similarly, the secondary winding may transfer data, such as sensor data, to the first end 102 via the primary winding 110. For example, a gyroscopic module of a vehicle or a LIDAR device on a vehicle may be configured in this manner to allow movement relative to a surface of the vehicle and also allow for power and information to be transmitted.

Within examples, device 100 corresponds to a LIDAR device. A first end of the LIDAR device corresponds to first end 102, and a second end of the LIDAR device corresponds to second end 106. The first end may include a first side of the transformer pair and the second end may include a plurality of light emitters, a plurality of light detectors, and a second side of the transformer pair. In these examples, the second side of the transformer pair is configured to power the plurality of light emitters and the plurality of light detectors by way of the first side of the transformer pair.

Though FIG. 1 is described with respect to a device 100 having a stationary first end and a movable second end providing a context for use of a transformer, it should be understood that other contexts for using a transformer to transmit power and information across a space are possible.

Figure 2:
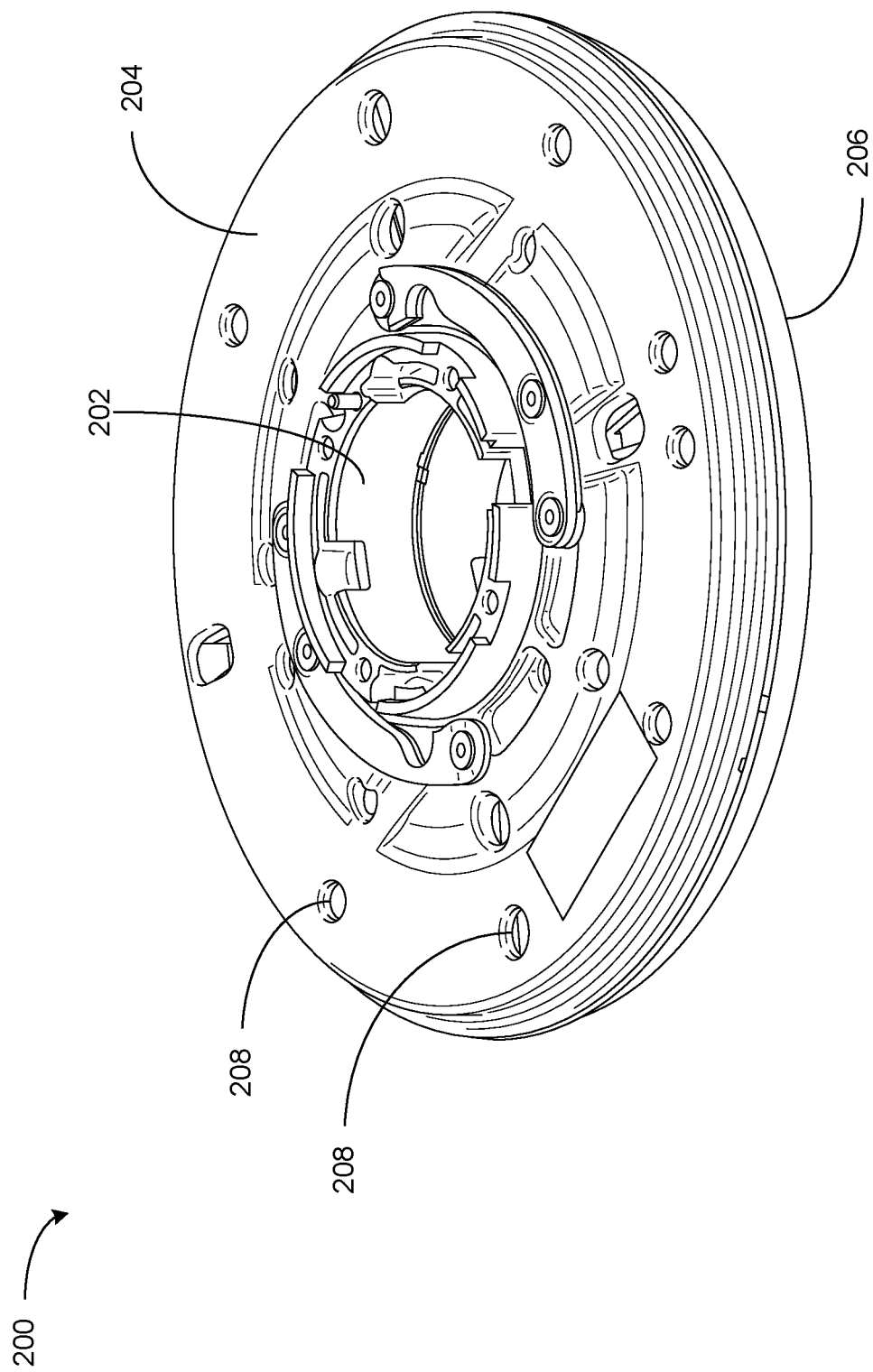
FIG. 2 illustrates a perspective view of a transformer pair, according to an example embodiment.

FIG. 2 illustrates a perspective view of a transformer pair 200, according to an example embodiment. In particular, FIG. 2 illustrates a first side 204 coupled to a second side 206. Both sides include a center portion 202 and an outer portion. In the present example, center portion 202 includes empty space, allowing for one or more components to pass through transformer pair 200.

FIG. 2 illustrates a mounting structure for a pair of magnetic cores (not shown). The magnetic cores correspond to a primary winding and a secondary winding for transmitting power and/or data between the first side 204 and second side 206. Transformer pair 200 further includes a plurality of mounting elements 208, which can be used to couple the magnetic cores to the mounting structure.

Figure 3A:
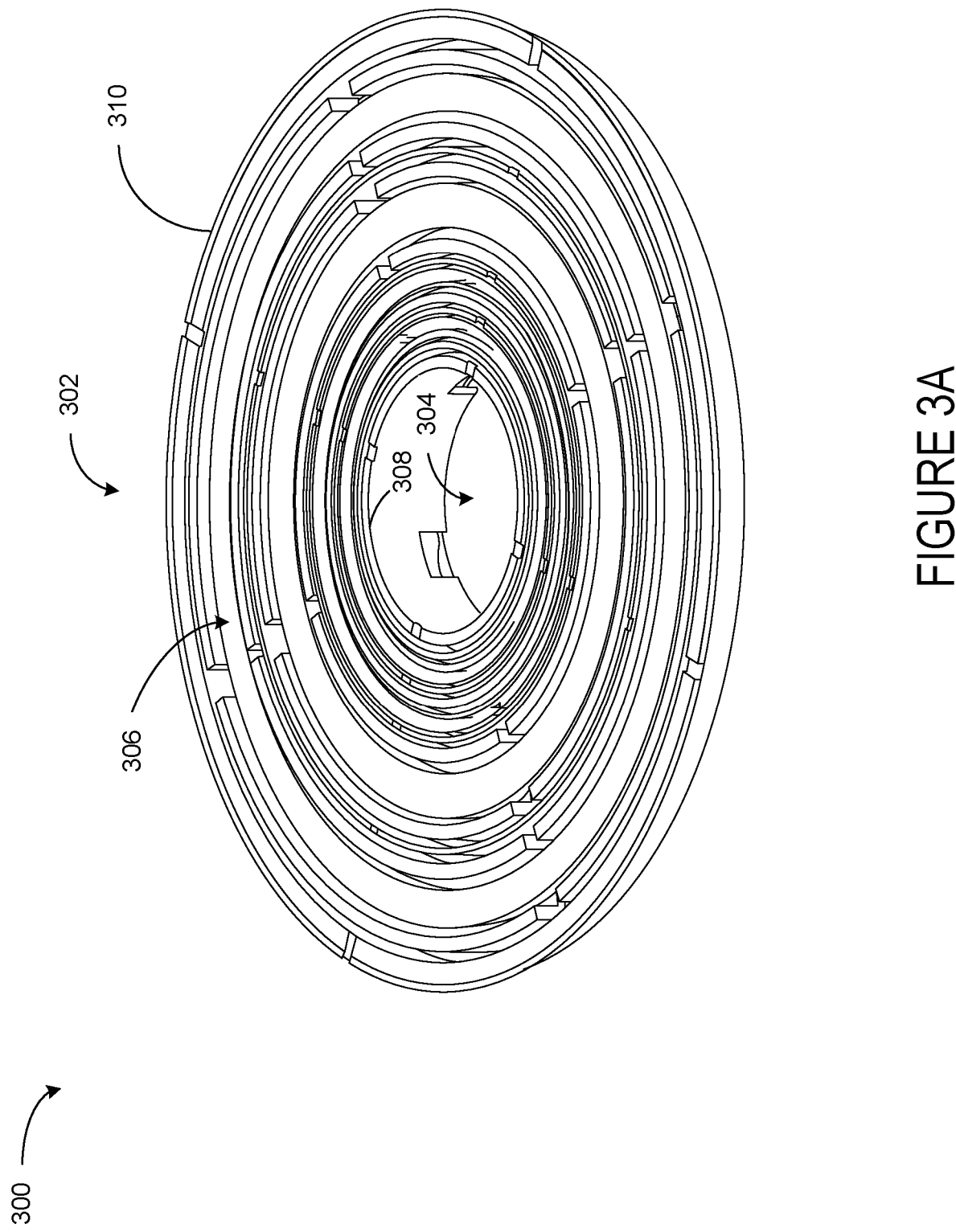
FIG. 3A illustrates a perspective view of a side of a transformer pair, according to an example embodiment.

FIG. 3A illustrates a perspective view of a side 300 of a transformer pair, according to an example embodiment. In particular, FIG. 3A shows a top surface of a mounting structure 302 and a plurality of magnetic cores of electric components included in side 300. The mounting structure 302 includes a center portion 304 and an outer portion 306. Outer portion 306 is defined by an inner edge 308 that corresponds to center portion 304 and an outer edge 310.

The mounting structure 302 includes a plurality of rings configured to provide lateral support to one or more components, such as the magnetic cores, and to keep these components in place. However, due to different CTEs between the mounting structure 302 and the components, the rings may impart strains on the components. For brittle components, such as a magnetic core that includes ceramic material (e.g., ferrite), these strains can result in chips or breaks that may impact performance of the transformer. This is described in further detail below with respect to FIGS. 6A, 6B, 7A, and 7B.

Within examples, side 300 can interchangeably be used as a first side or a second side of a transformer pair. Accordingly, an assembled transformer pair may include two sides that are each configured substantially as shown in FIG. 3A. In an assembled state, the top surfaces of the sides face one another, and may resemble transformer pair 200 shown in FIG. 2.

Reference is now made to FIGS. 3B-3E, which provide simplified representations of side 300 to more clearly illustrate the plurality of magnetic cores and rings included in side 300.

Figure 3B:
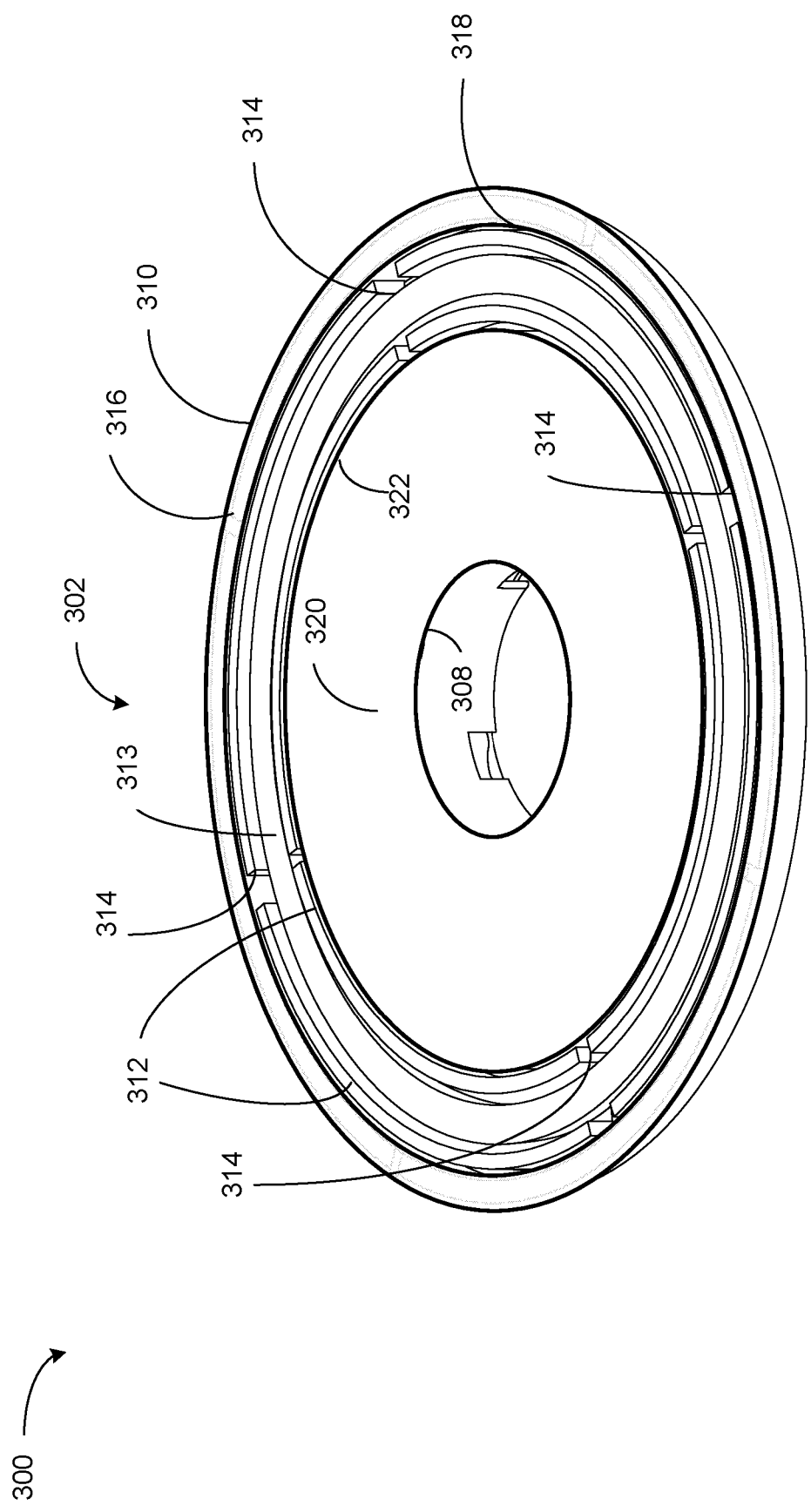
FIG. 3B illustrates a perspective view of a side of a transformer pair, according to an example embodiment.

FIG. 3B illustrates a perspective view of side 300, according to an example embodiment. In particular, FIG. 3B shows a simplified version of side 300 shown in FIG. 3A. The simplified illustration depicts a first magnetic core 312 and omits other components of side 300. First magnetic core 312 is configured as a trench that holds a first winding 313. First magnetic core 312 is also separated into a plurality of sections separated by a plurality of spaces 314. First winding 313 is held by each of the sections. As described above with respect to FIG. 3A, the mounting structure 302 includes a plurality of rings. In the simplified example, two rings are shown: an outer ring 316 defined by the outer edge 310 of the mounting structure 302 and an outer edge 318 of the first magnetic core 312, and an inner ring 320 defined by inner edge 308 of mounting structure 302 and an inner edge 322 of first magnetic core 312. Though inner ring 320 is depicted as spanning an entire space between inner edge 322 and inner edge 308, a smaller ring may be used to provide support for first magnetic core 312 while allowing for additional components to be coupled to mounting structure 302, as shown in FIG. 3A.

Additional rings, such as those depicted in FIG. 3A, may be included to provide support for other components, such as a second magnetic core, a third magnetic core, and a fourth magnetic core nested in inner ring 320. In these examples, a first transformer that includes first magnetic core 312 may be used for power transfer, while another transformer that includes the another magnetic core may be used for data transfer. Other configurations of magnetic cores are possible, and other components can be coupled to mounting structure 302.

Within examples, when assembled, the sides of the transformer pair may rotate relative to one another. For example, a first side may remain stationary while the other side rotates. In these examples, a rotating component may be disposed in the space corresponding to center portion 304. The stationary side may be part of a stationary portion of a device (e.g., a LIDAR device), while the rotating portion may be part of a rotating portion of the device.

FIG. 3B also shows the plurality of spaces 314 separating different sections of first magnetic core 312. These spaces allow for first magnetic core 312 to experience less strain when mounting structure 302 expands and contracts in response to changing thermal conditions. For example, as mounting structure 302 expands or contracts, a size of spaces 314 can correspondingly expand or contract, reducing mechanical forces imparted on first magnetic core 312. This is described in further detail with respect to FIGS. 6A, 6B, 7A, and 7B.

Figure 3C:
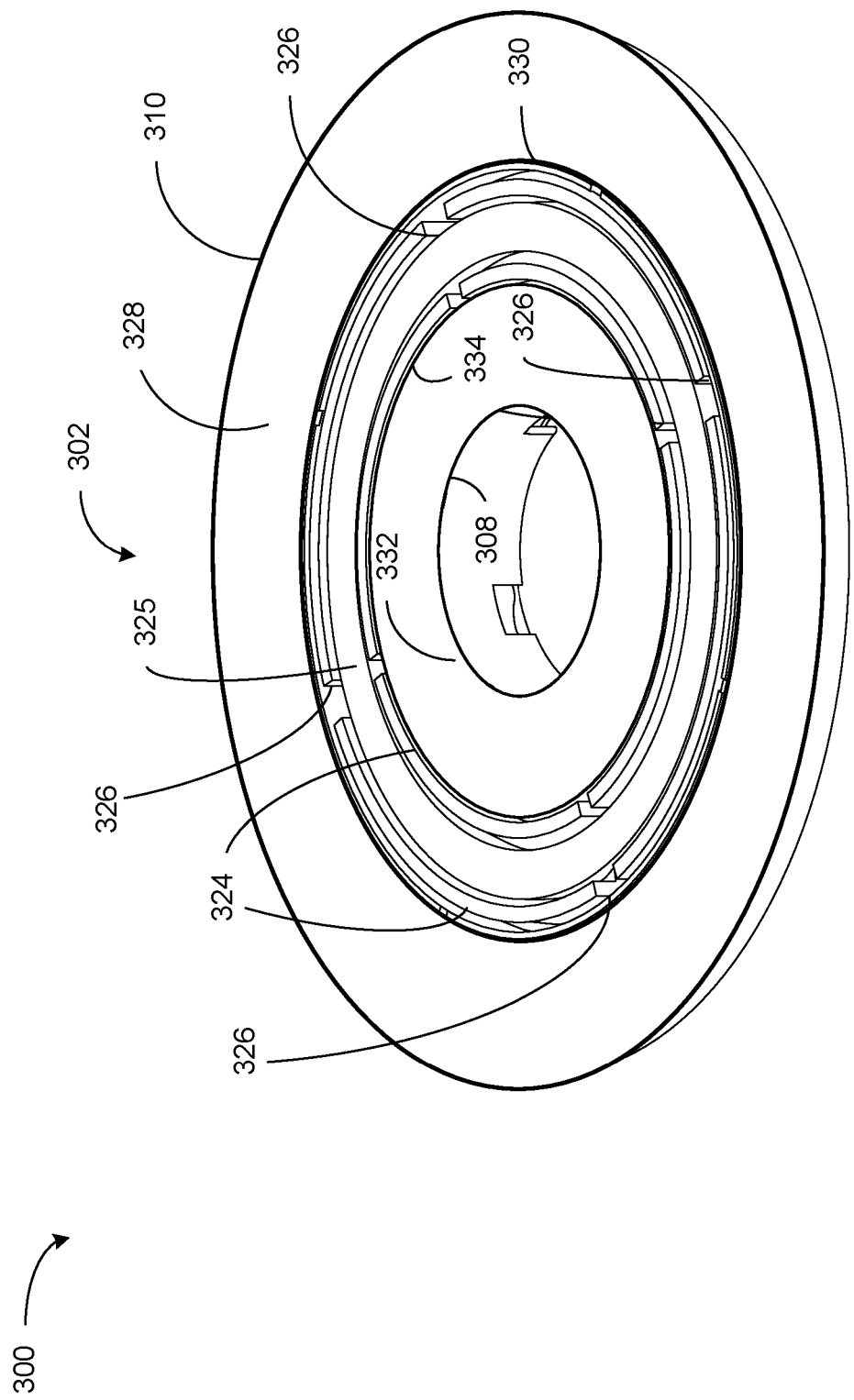
FIG. 3C illustrates a perspective view of a side of a transformer pair, according to an example embodiment.

FIG. 3C illustrates a perspective view of side 300, according to an example embodiment. In particular, FIG. 3C shows a simplified version of side 300 shown in FIG. 3A. The simplified illustration depicts a second magnetic core 324 and omits other components of side 300. Second magnetic core 324 is configured as a trench that holds a second winding 325. Second magnetic core 324 is also separated into a plurality of sections separated by a plurality of spaces 326. Second winding 325 is held by each of the sections. As described above with respect to FIG. 3A, the mounting structure 302 includes a plurality of rings. In the simplified example, two rings are shown: an outer ring 328 defined by the outer edge 310 of the mounting structure 302 and an outer edge 330 of second magnetic core 324, and an inner ring 332 defined by inner edge 308 of mounting structure 302 and an inner edge 334 of second magnetic core 324. Though inner ring 332 is depicted as spanning an entire space between inner edge 334 and inner edge 308, a smaller ring may be used to provide support for second magnetic core 324 while allowing for additional components to be coupled to mounting structure 302, as shown in FIG. 3A. Similarly, while outer ring 328 is depicted as spanning an entire space between outer edge 330 and outer edge 310, a smaller ring may be used to provide support for second magnetic core 324 while allowing for additional components (e.g., first magnetic core 312 and first winding 313) to be coupled to mounting structure 302, as shown in FIG. 3A.

FIG. 3C also shows the plurality of spaces 326 separating different sections of second magnetic core 324. These spaces allow for second magnetic core 324 to experience less strain when mounting structure 302 expands and contracts in response to changing thermal conditions. For example, as mounting structure 302 expands or contracts, a size of spaces 326 can correspondingly expand or contract, reducing mechanical forces imparted on second magnetic core 324. This is described in further detail with respect to FIGS. 6A, 6B, 7A, and 7B.

Figure 3D:
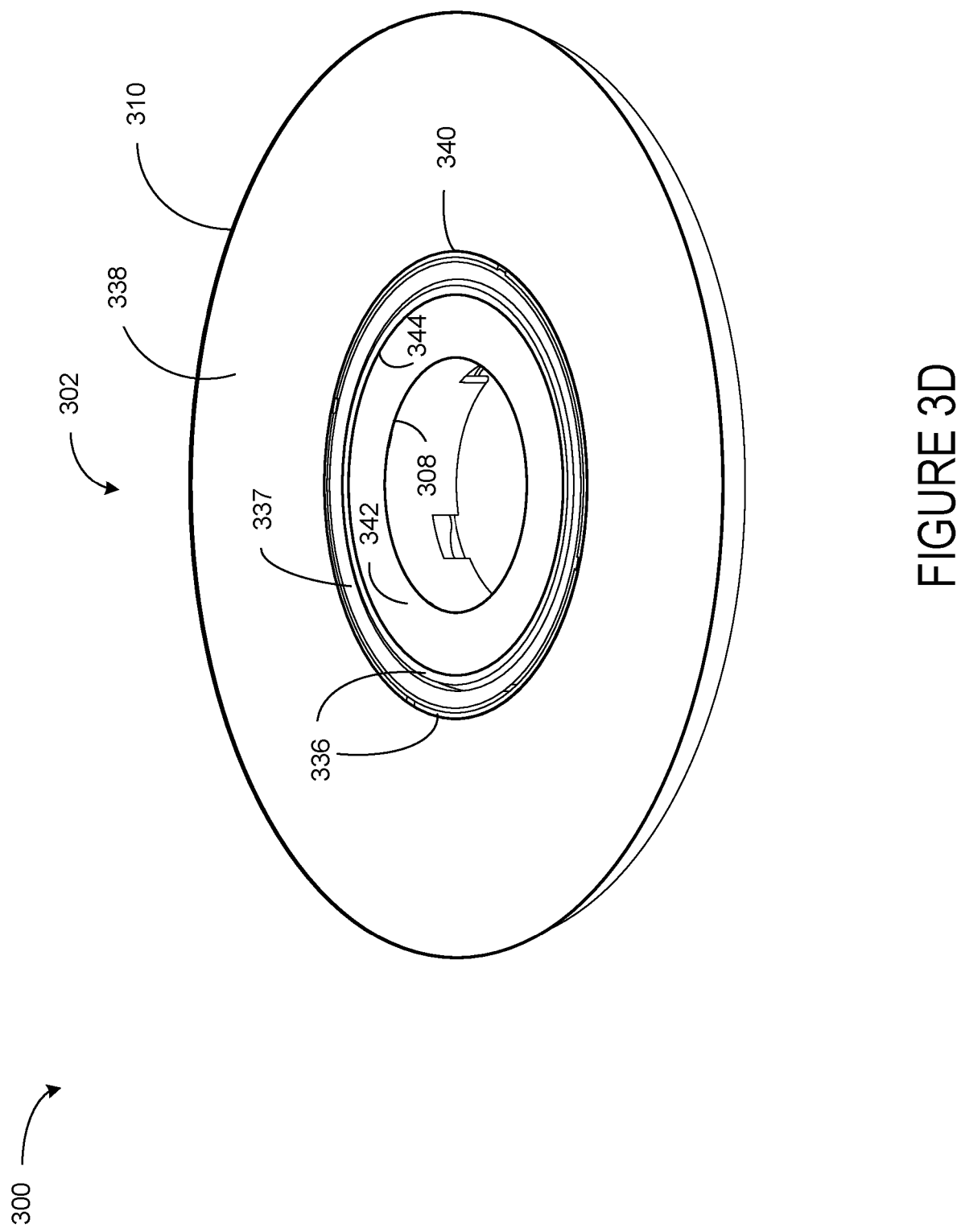
FIG. 3D illustrates a perspective view of a side of a transformer pair, according to an example embodiment.

FIG. 3D illustrates a perspective view of side 300, according to an example embodiment. In particular, FIG. 3D shows a simplified version of side 300 shown in FIG. 3A. The simplified illustration depicts a third magnetic core 336 and omits other components of side 300. Third magnetic core 336 is configured as a trench that holds a third winding 337. As described above with respect to FIG. 3A, the mounting structure 302 includes a plurality of rings. In the simplified example, two rings are shown: an outer ring 338 defined by the outer edge 310 of the mounting structure 302 and an outer edge 340 of third magnetic core 336, and an inner ring 342 defined by inner edge 308 of mounting structure 302 and an inner edge 344 of third magnetic core 336. Though inner ring 342 is depicted as spanning an entire space between inner edge 344 and inner edge 308, a smaller ring may be used to provide support for third magnetic core 336 while allowing for additional components to be coupled to mounting structure 302, as shown in FIG. 3A. Similarly, while outer ring 338 is depicted as spanning an entire space between outer edge 340 and outer edge 310, a smaller ring may be used to provide support for third magnetic core 336 while allowing for additional components (e.g., first magnetic core 312, first winding 313, second magnetic core 324, and second winding 325) to be coupled to mounting structure 302, as shown in FIG. 3A.

FIG. 3D does not show a plurality of spaces separating different sections of third magnetic core 336. This is because differences in expansion and contraction between mounting structure 302 and the magnetic cores lessen towards the center of mounting structure 302. Accordingly, in examples such as that shown in FIG. 3A, a plurality of magnetic cores can be oriented concentrically relative to a center point on mounting structure 302, and the number of sections of respective magnetic cores may increase as the magnetic cores become closer to outer edge 310 of mounting structure 302. In the present example, this is depicted with third magnetic core 336 having one section, and first magnetic core 312 and second magnetic core 324 each having four sections. In other examples the number of sections could have other variations (e.g., first magnetic core 312 having six sections, second magnetic core 324 having 4 sections, and so on). This allows for reduction in strains imparted on magnetic cores that are likely to experience greater strains due to expansion and contraction of mounting structure, while allowing other magnetic cores to have more support and reducing the overall number of pieces coupled to mounting structure 302.

Figure 3E:
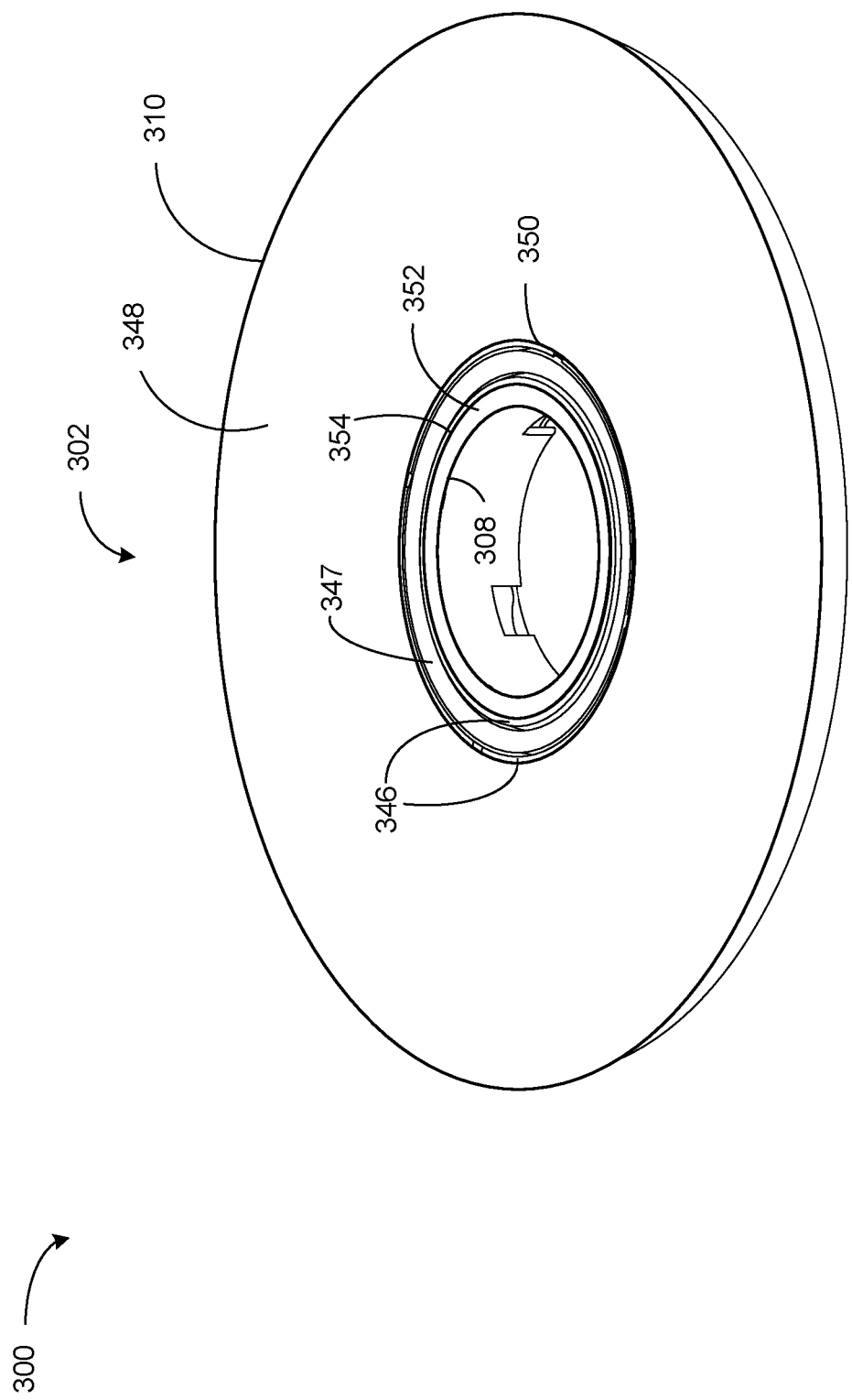
FIG. 3E illustrates a perspective view of a side of a transformer pair, according to an example embodiment.

FIG. 3E illustrates a perspective view of side 300, according to an example embodiment. In particular, FIG. 3E shows a simplified version of side 300 shown in FIG. 3A. The simplified illustration depicts a fourth magnetic core 346 and omits other components of side 300. Third magnetic core 336 is configured as a trench that holds a fourth winding 347. As described above with respect to FIG. 3A, the mounting structure 302 includes a plurality of rings. In the simplified example, two rings are shown: an outer ring 348 defined by the outer edge 310 of the mounting structure 302 and an outer edge 350 of fourth magnetic core 346, and an inner ring 352 defined by inner edge 308 of mounting structure 302 and an inner edge 354 of fourth magnetic core 346. Though outer ring 348 is depicted as spanning an entire space between outer edge 350 and outer edge 310, a smaller ring may be used to provide support for fourth magnetic core 346 while allowing for additional components (e.g., first magnetic core 312, first winding 313, second magnetic core 324, second winding 325, third magnetic core 336, and third winding 337) to be coupled to mounting structure 302, as shown in FIG. 3A.

Similarly to FIG. 3D, FIG. 3E does not show a plurality of spaces separating different sections of fourth magnetic core 346. This is because differences in expansion and contraction between mounting structure 302 and the magnetic cores lessen towards the center of mounting structure 302.

As noted above, different magnetic cores of mounting structure 302 may correspond to different functionalities. For example, a first transformer associated with first magnetic core 312 may be used for power transfer between a two sides of a transformer pair, and a third transformer associated with third magnetic core 336 may be used for data transfer between two sides of the transformer pair. Other variations in functionality of the magnetic cores and windings are possible.

Figure 3F:
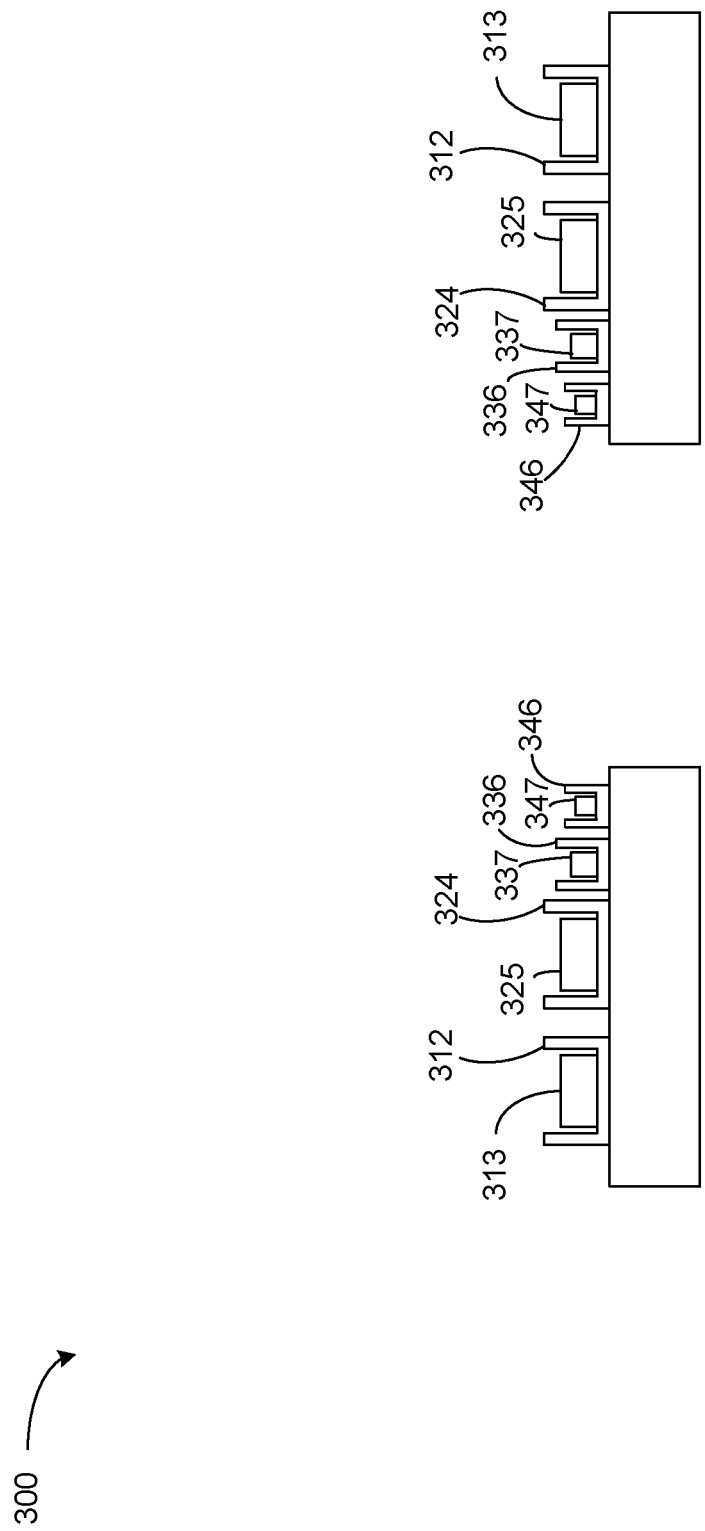
FIG. 3F illustrates a cross-sectional side view of a side of a transformer pair, according to an example embodiment.

FIG. 3F illustrates a cross-sectional side view of side 300, according to an example embodiment. In particular, FIG. 3F shows a simplified version of side 300 shown in FIG. 3A, in which the rings surrounding the magnetic cores and windings are omitted. While FIGS. 3B-3E depict the magnetic cores and windings being substantially aligned on a plane, the magnetic cores and windings can have different heights. FIG. 3F illustrates an example wherein first magnetic core 312 and second magnetic core 324 are aligned at a first height, third magnetic core 336 is at a second height, and fourth magnetic core 346 is at a third height.

Aligning the magnetic cores at different heights may allow for increased adaptability for transmitting power and/or data from side 300 to a second side of the transformer pair. For example, first magnetic core 312 and second magnetic core 324 may be used for power transfer, while third magnetic core 336 and fourth magnetic core 346 are used for data transmission. Using different heights for the first and second magnetic cores and the third and fourth magnetic cores may reduce interference in data communication. Similarly, using different heights for third magnetic core 336 and fourth magnetic core 346 may reduce cross talk between separate communication channels.

Though FIG. 3F shows an example configuration of heights magnetic cores and windings relative to a common base, different configurations of heights are possible. For example, each magnetic core may have a different height relative to the mounting structure, or magnetic cores for data communication may have different heights from magnetic cores used for power transfer. More generally, a side of a transformer pair can include a plurality of magnetic cores coupled to an outer portion of a mounting structure, a first magnetic core can have a first height, and a second magnetic core can have a second height that is different from the first height.

Figure 4:
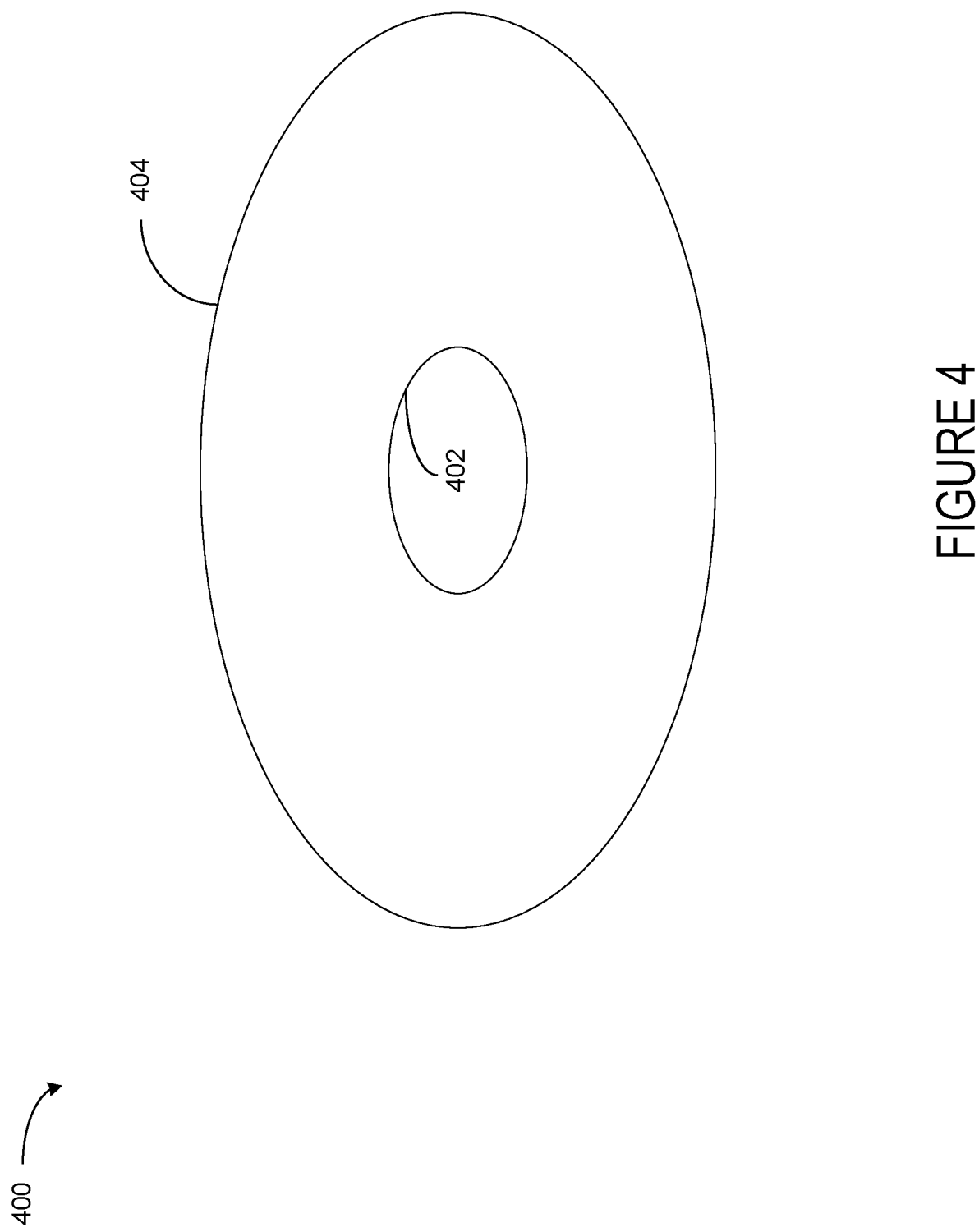
FIG. 4 illustrates a perspective view of a film for a side of a transformer pair, according to an example embodiment.

FIG. 4 illustrates a perspective view of a film 400 for a side of a transformer pair, according to an example embodiment. For example, film 400 may align with side 300 depicted in FIGS. 3A and 3B.

In some examples, even with reduced strains imparted on the magnetic core, the magnetic core may break or chip, and pieces of the core may fall into the transformer pair or a device that includes the transformer pair. In examples in which the sides of the transformer pair relative to each other, these pieces may impede rotation of the transformer pair or the device.

Film 400 is configured to contain pieces of the magnetic core, and can be applied to a top surface of the side of the transformer pair. For example, film 400 may include an adhesive that attached film 400 to the side of the transformer pair. For example, film 400 may be a plastic material or a silicon material with an adhesive applied to a side facing the top surface of the side of the transformer pair. Pieces that break off from the magnetic core can stick to the adhesive or fall into spaces within the mounting structure of the transformer pair that do not affect rotation of the transformer pair or the device. In other examples, film 400 can include tabs that can be coupled to the mounting structure using tape, an adhesive, or another means of coupling the tabs to the mounting structure.

Other ways of capturing broken pieces of magnetic cores are possible. For example, a potting material can be applied surrounding each magnetic core to prevent pieces falling away from the magnetic core due to strains from the mounting structure expanding and contracting.

Figure 5:
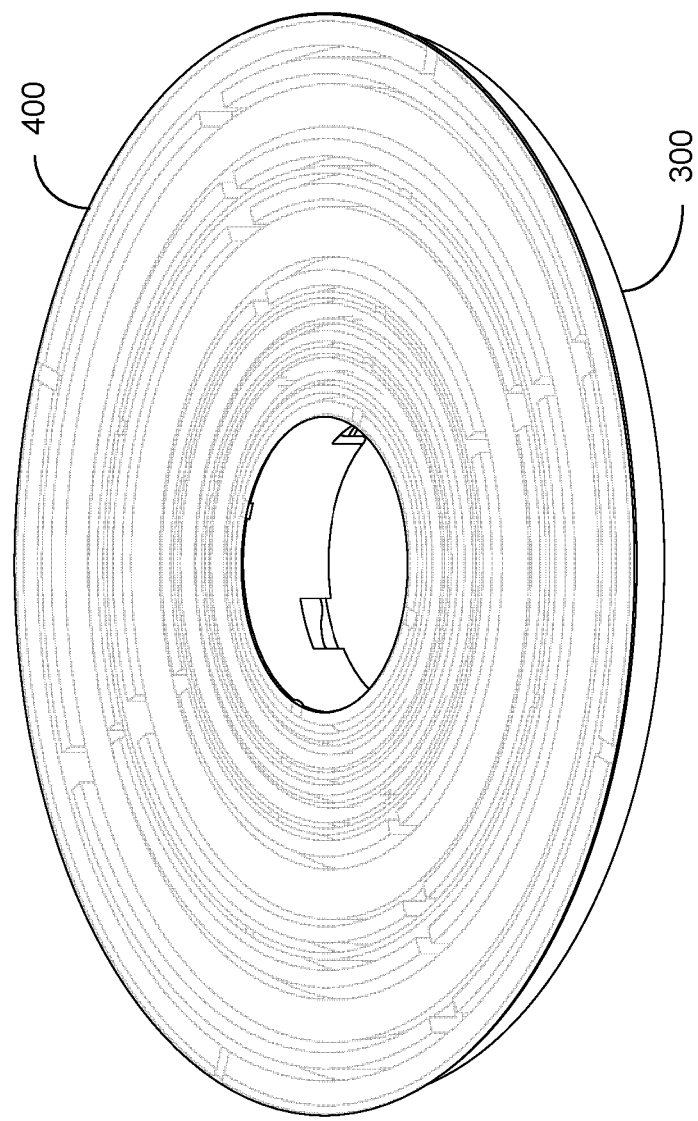
FIG. 5 illustrates a perspective view of a film covering a side of a transformer pair, according to an example embodiment.

FIG. 5 illustrates a perspective view of film 400 covering side 300 of a transformer pair, according to an example embodiment. Film 400 includes an inner edge 402 that aligns with an inner edge of the mounting structure (e.g., inner edge 308) and an outer edge 404 that aligns with an outer edge of the mounting structure (e.g., outer edge 310). Aligning the edges of film 400 and a mounting structure of side 300 may prevent pieces of the magnetic core from falling out of the transformer pair, and thus film 400 facilitates rotation of the transformer pair or a corresponding device.

Figure 6B:
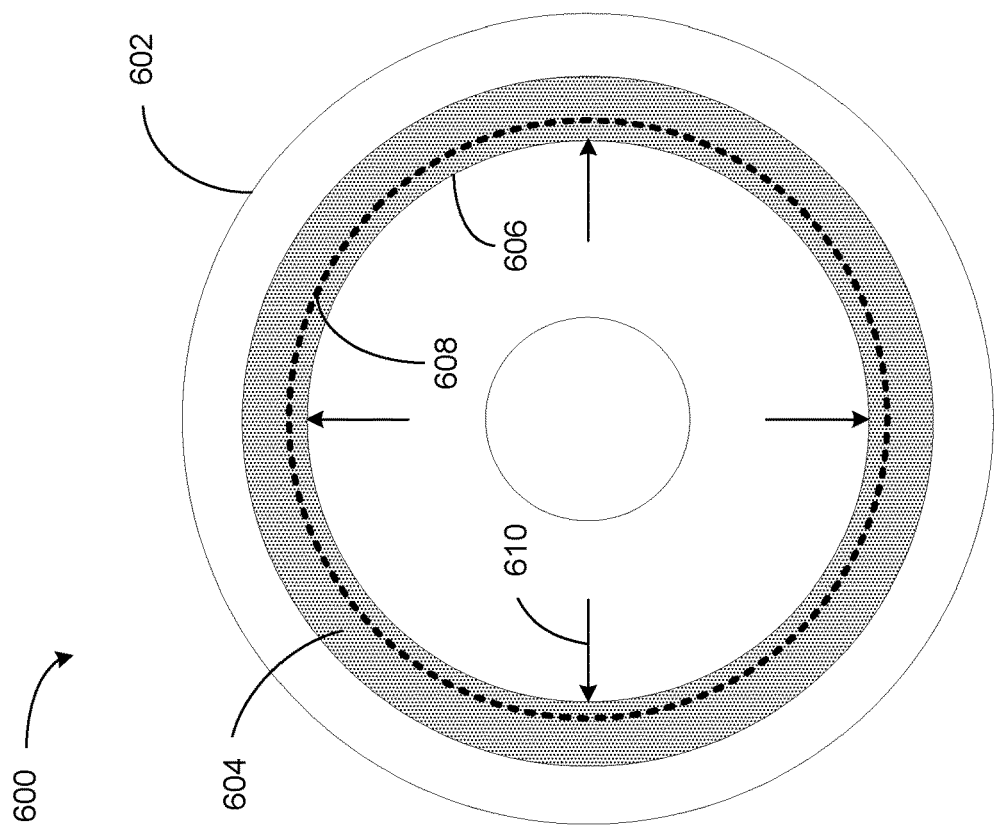
FIG. 6B illustrates a top view of a side of a transformer pair in second thermal conditions, according to an example embodiment.
Figure 6A:
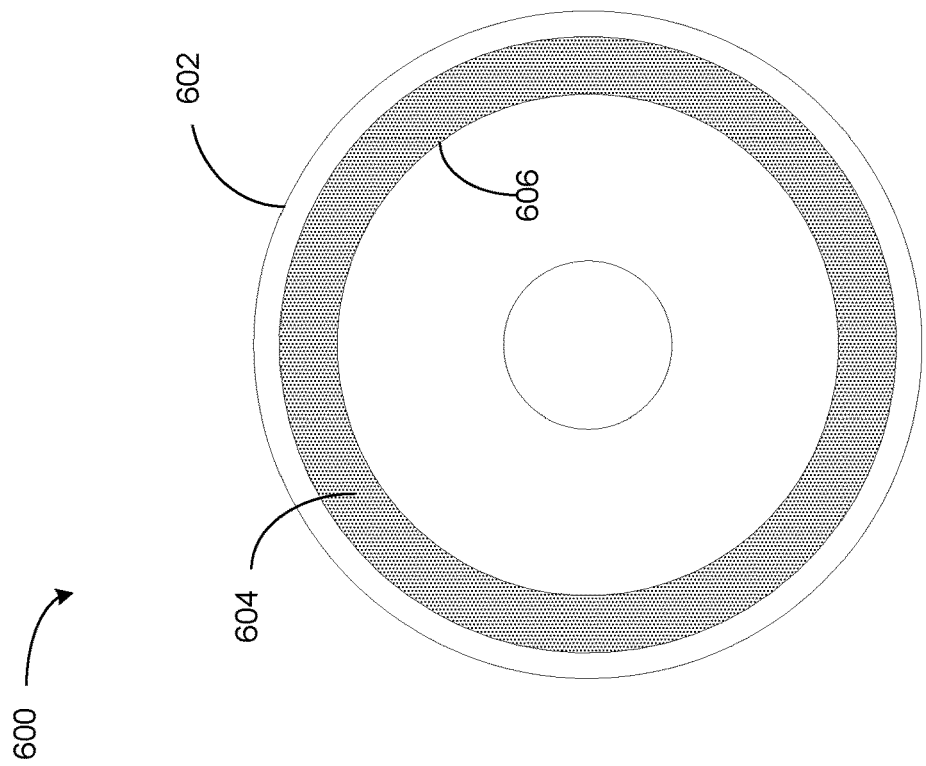
FIG. 6A illustrates a top view of a side of a transformer pair in first thermal conditions, according to an example embodiment.

FIG. 6A illustrates a top view of a side 600 of a transformer pair in first thermal conditions, according to an example embodiment. In particular, FIG. 6A shows an example in which a magnetic core 604 does not include any spaces. Side 600 includes a mounting structure having an outer ring 602 and an inner ring 606 surrounding magnetic core 604. Surrounding magnetic core in this manner keeps magnetic core in place, and maintains alignment between magnetic core 604 with a corresponding magnetic core in a corresponding side of a transformer pair, allowing the transformer pair to operate efficiently.

FIG. 6A shows side 600 under typical thermal conditions (e.g., at room temperature). In this example, the mounting surface, including outer ring 602 and inner ring 606 are composed of an aluminum material and have a first CTE between 21 and 25 $10^{-6}/°$ C., and magnetic core 604 is composed of a ferrite material having a second CTE between 15 and 19 $10^{-6}/°$ C. Other materials (e.g., other metals) can be used for outer ring 602 and inner ring 606, and other materials (e.g., other magnetic materials) can be used for magnetic core 604.

FIG. 6B illustrates a top view of side 600 of the transformer pair in second thermal conditions, according to an example embodiment. In particular, FIG. 6B shows the effects of an increased temperature (e.g., from room temperature to 50° C.) on outer ring 602, inner ring 606, and magnetic core 604. FIG. 6B shows that the mounting structure and the magnetic core 604 have both expanded due to the increased temperature, but outer ring 602 has expanded more than magnetic core 604 due to outer ring 602 having a higher CTE than magnetic core 604, and inner ring 606 is restricted by magnetic core 604 due to inner ring 606 having a higher CTE than magnetic core 604. This restriction is illustrated with nominal edge 608, which shows how far inner ring 606 would expand without restriction by magnetic core 604. This difference in expansion causes mechanical forces 610 to be imparted between inner ring 606 and magnetic core 604. This may strain magnetic core 604 and cause it to break.

FIGS. 6A and 6B illustrate added strains on magnetic core 604 that are caused by increasing temperatures. Similar strains might be imparted in decreasing temperatures beyond an operating temperature (e.g., below room temperature). In these examples, added forces and consequent strains may be imparted from outer ring 602 to magnetic core 604.

Figure 7B:
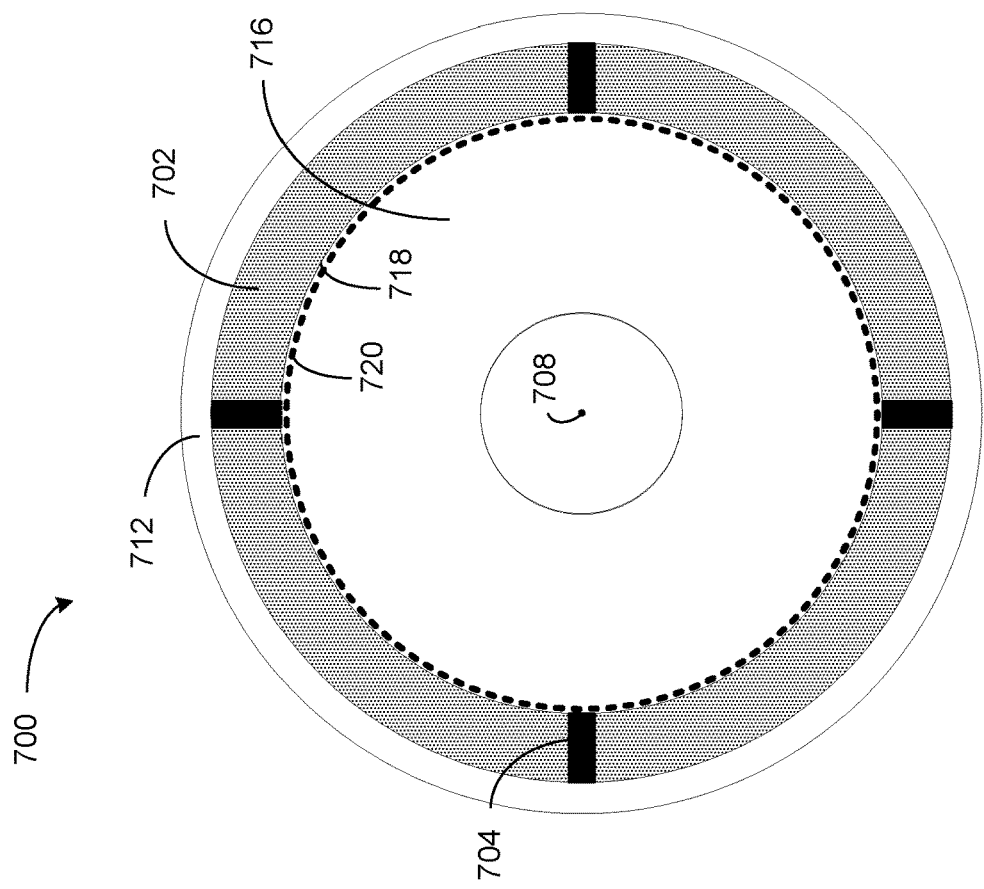
FIG. 7B illustrates a top view of a side of a transformer pair in second thermal conditions, according to an example embodiment.
Figure 7A:
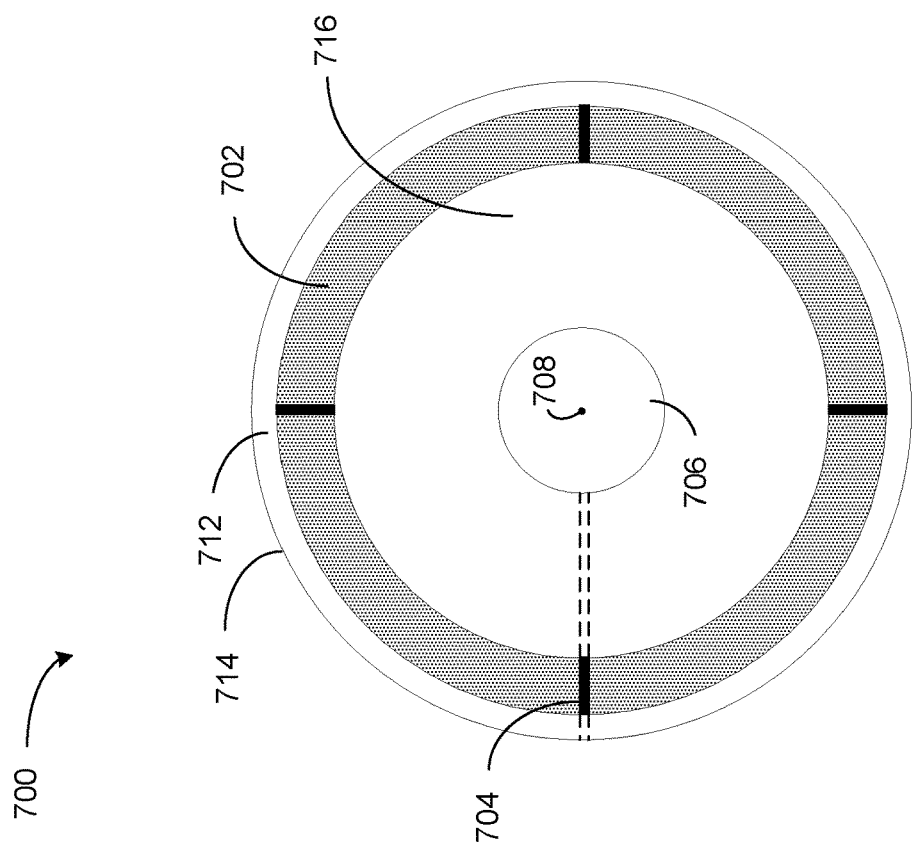
FIG. 7A illustrates a top view of a side of a transformer pair in first thermal conditions, according to an example embodiment.

FIG. 7A illustrates a top view of a side 700 of a transformer pair in first thermal conditions, according to an example embodiment. In particular, FIG. 7A shows an example in which a magnetic core 702 includes spaces 704. Spaces 704 extend from a center point 708 of a center portion 706 of the mounting structure to the outer edge 714 of the mounting structure. The mounting structure of side 700 includes an outer ring 712 and an inner ring 716 surrounding magnetic core 702.

FIG. 7A shows side 700 under typical thermal conditions (e.g., at room temperature). In this example, the mounting surface, including outer ring 712 and inner ring 716 are composed of an aluminum material and have a first CTE between 21 and 25 $10^{-6}/°$ C., and magnetic core 702 is composed of a ferrite material having a second CTE between 15 and 19 $10^{-6}/°$ C.

FIG. 7B illustrates a top view of side 700 of the transformer pair in second thermal conditions, according to an example embodiment. In particular, FIG. 7B shows the effects of an increased temperature (e.g., from room temperature to 50° C.) on outer ring 712, inner ring 716, and magnetic core 702. FIG. 7B shows that the mounting structure and the magnetic core 702 have both expanded due to the increased temperature, and spaces 704 have correspondingly increased in size. Accordingly, during first thermal conditions, the plurality of sections of magnetic core 702 are separated by a first distance and, during second thermal conditions, the plurality of sections are separated by a second distance that is different from the first distance.

Spaces 704 allow magnetic core 702 to expand at a similar rate to the mounting surface, even though outer ring 712 and inner ring 716 have a higher CTE than magnetic core 702. This reduces mechanical forces and consequent strains imparted on magnetic core 702. This is illustrated with nominal edge 720, which aligns with an inner edge 718 of magnetic core 702. The different sections of magnetic core 702 remain aligned with center point 708 in changing thermal conditions. Further details regarding the effect of spaces 704 on thermal expansion of magnetic core 702 are described below with respect to FIGS. 9A and 9B.

FIGS. 7A and 7B illustrate reduced strains on magnetic core 702 resulting from spaces 704. Similar strain reduction might be achieved in decreasing temperatures beyond an operating temperature (e.g., below room temperature). In these examples, spaces 704 contract without allowing adjacent sections of magnetic core 702 to contact one another. This prevents forces and consequent strains imparted from outer ring 712 on magnetic core 702.

Figure 8B:
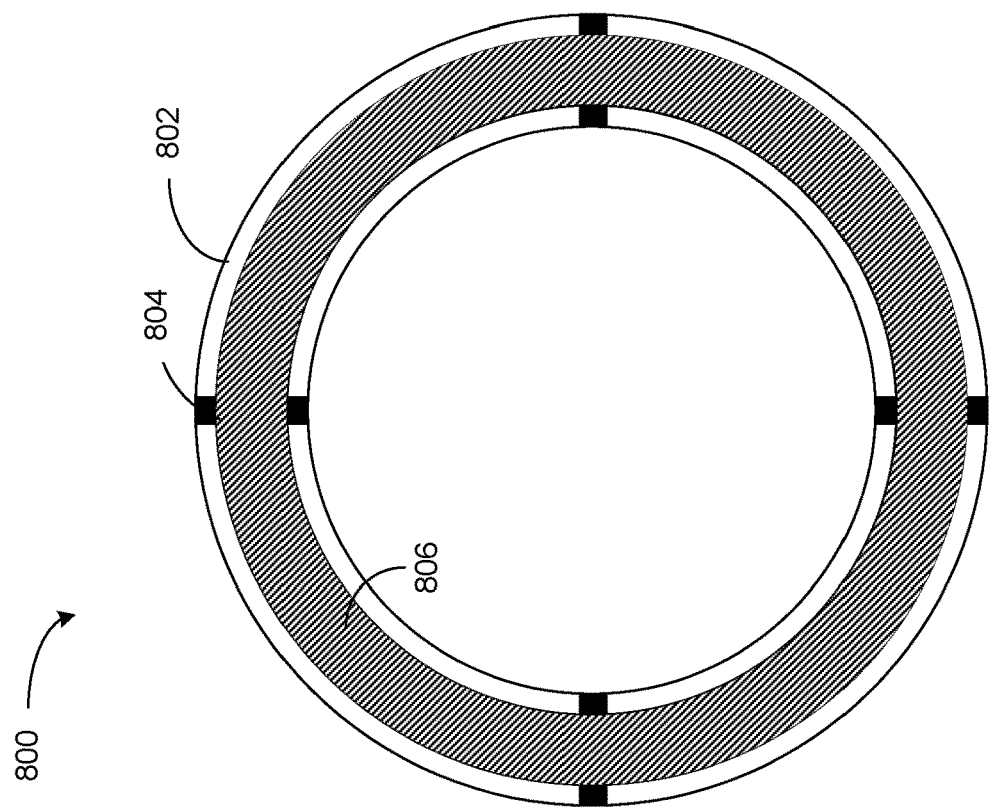
FIG. 8B illustrates a top view of a magnetic core in second thermal conditions, according to an example embodiment.
Figure 8A:
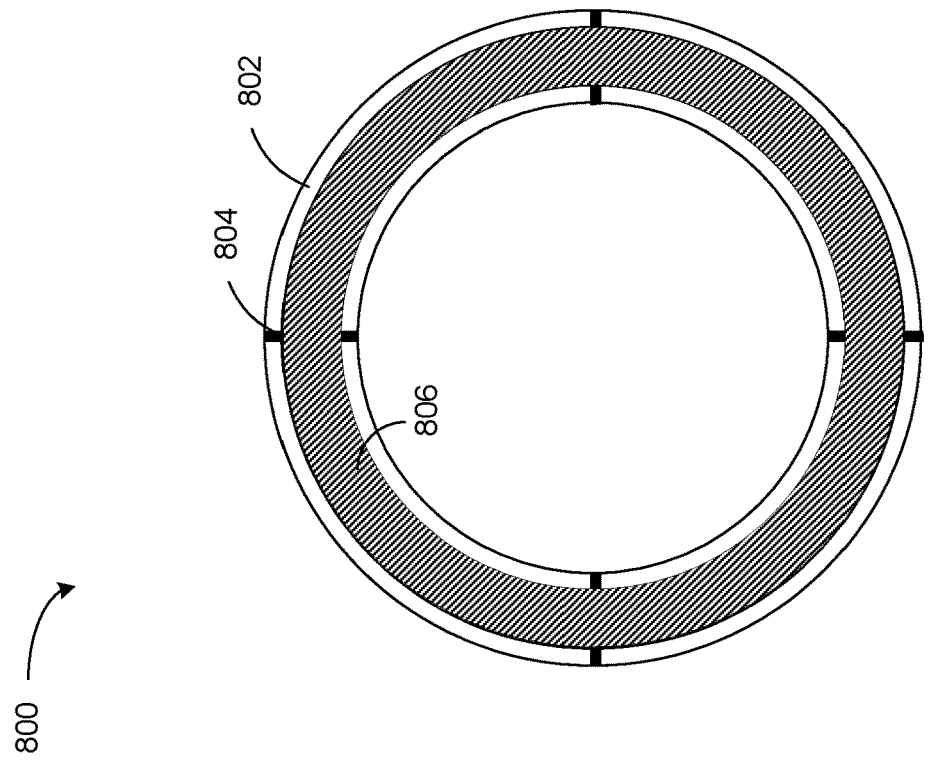
FIG. 8A illustrates a top view of a magnetic core in first thermal conditions, according to an example embodiment.

FIG. 8A illustrates a top view of a magnetic core 800 in first thermal conditions, according to an example embodiment. In particular, FIG. 8A shows magnetic core 800 under typical thermal conditions (e.g., at room temperature). Magnetic core 800 includes a plurality of sections 802 separated by spaces 804. A winding 806 of a transformer is coupled to the plurality of sections 802.

FIG. 8B illustrates a top view of magnetic core 800 in second thermal conditions, according to an example embodiment. In particular, FIG. 8B shows the effects of an increased temperature (e.g., from room temperature to 50° C.) on magnetic core 800. At the increased temperature, spaces 804 expand and the sections 802 expand. Winding 806 may include a wound wire that is configured to expand at the increased temperature such that it spans the spaces 804 even in their expanded state. Accordingly, winding 806 of the transformer is configured to adjust in response to a changing size of spaces 804 between the plurality of sections 802. This allows the transformer to continue operating even when sections 802 are further separated from one another.

Figure 9A:
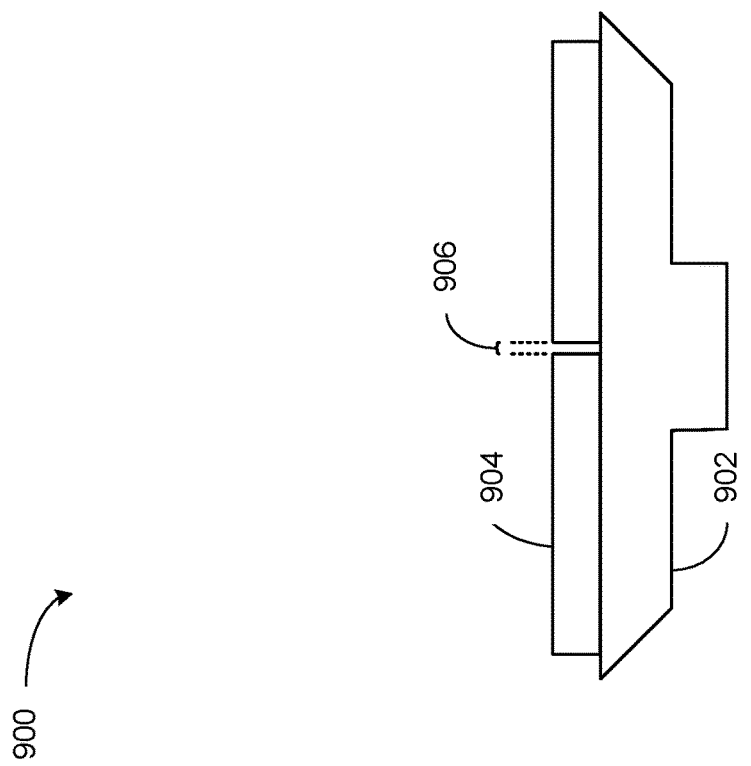
FIG. 9A illustrates a side view of a side of a transformer pair in first thermal conditions, according to an example embodiment.

FIG. 9A illustrates a side view of a side 900 of a transformer pair in first thermal conditions, according to an example embodiment. In particular, FIG. 9A shows side 900 under typical thermal conditions (e.g., at room temperature). Side 900 includes a base 902, which is part of a mounting structure of side 900, a magnetic core 904 mounted on base 902, and a space 906. Additional portions of side 900 are omitted for purposes of simplicity. Base 902, an outer ring of the mounting structure, and the inner ring of the mounting structure may each include the same material so that they expand or contract at similar rates in changing thermal conditions.

Figure 9B:
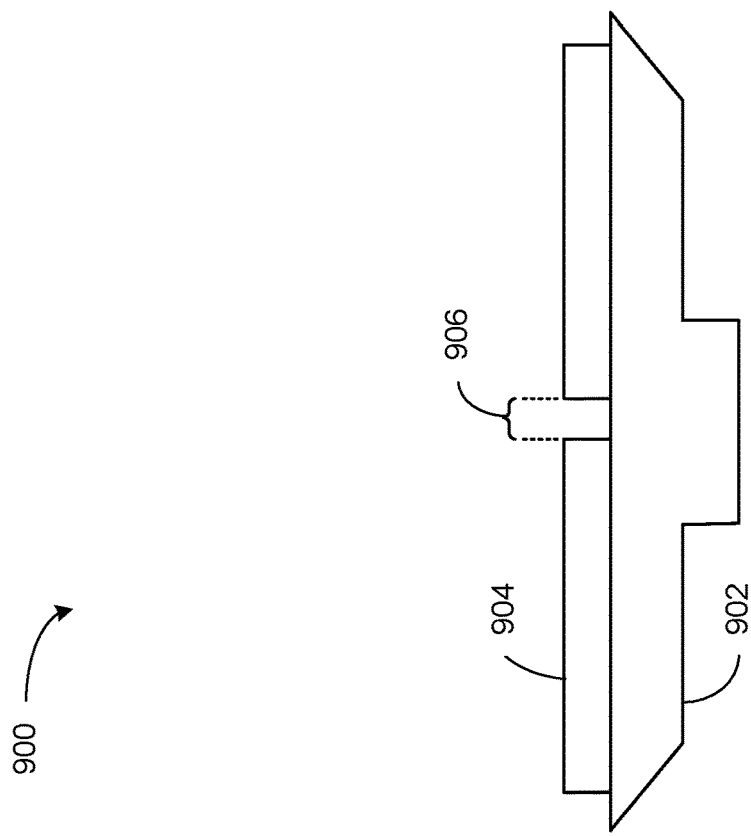
FIG. 9B illustrates a side view of a side of a transformer pair in second thermal conditions, according to an example embodiment.

FIG. 9B illustrates a side view of side 900 of the transformer pair in second thermal conditions, according to an example embodiment. In particular, FIG. 9B shows the effects of an increased temperature (e.g., from room temperature to 50° C.) on side 900. At the increased temperature, base 902 expands. Because magnetic core 904 is split into a plurality of sections separated by spaces 906, and each section is coupled to base 902, the sections further separate from one another as base 902 expands, and spaces 906 increase in size. While this subjects magnetic core 904 to mechanical forces from base 902, other mechanical forces and consequent strain from an inner ring of the mounting structure is reduced. To further reduce forces experienced by magnetic core 904, a pliable adhesive can be used to couple magnetic core 904 to base 902. For example, a rubberized adhesive can be used for coupling to allow further flexibility of magnetic core 904 relative to base 902, thereby further reducing imparted strains.

As noted above, the transformer pair may include a plurality of electric components (e.g., a plurality of transformers) that are coupled to the mounting structure in a similar manner to the magnetic core described herein. Each electric component may similarly include a plurality of sections separated by spaces that allow for the component to operate with lessened strain in changing thermal conditions.

III. Example Methods

FIG. 10 is a block diagram of a method, according to an example embodiment. In particular, FIG. 10 depicts a method 1000 for use in assembling, manufacturing, or installing a device (e.g., device 100). Aspects of the functions of method 1000 may be performed automatically by a computing device or a computing device controlling a mechanism (e.g., a robot or a controllable arm), and other aspects may be performed manually.

A computing device used in performing method 1000 may include one or more processors, a memory, and instructions stored on the memory and executable by the processor(s) to perform functions. The processor(s) can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein The memory may include a computer readable medium, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are contemplated herein.

At block 1002, method 1000 includes, providing a mounting structure comprising a first material having a first coefficient of thermal expansion (CTE). The mounting structure includes an center portion and an outer portion.

At block 1004, method 1000 includes coupling a magnetic core for an electrical component to the outer portion of the mounting structure. The magnetic core includes a second material having a second CTE, and is split into a plurality of sections separated by spaces extending from the center portion to an outer edge of the outer portion. Each of the plurality of sections is separately coupled to the mounting structure, and each of the plurality of sections is connected to the electrical component. For example, the electrical component can be a winding of a transformer.

Within examples, method 1000 may further include determining a size of the spaces based on the first material and the second material. For example, a computing device may access a database of materials and corresponding CTEs, determine the first CTE of the first material (e.g., a material of a mounting structure), determine a second CTE of the second material (e.g., a material of the magnetic core), and select a size of the space based on the first CTE, the second CTE. This may further be based on determining strain tolerance characteristics of the magnetic core (e.g., a ferrite core), determining a projected force imparted by the mounting surface to the component based on CTEs of the mounting surface and the component for different sizes of the spaces, and determining whether the projected force exceeds a threshold force associated with the strain tolerance.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
    a mounting structure comprising a first material having a first coefficient of thermal expansion (CTE), wherein the mounting structure comprises:
        an outer ring;
        an intermediary ring; and
        an inner ring;
    a first magnetic core coupled to the mounting structure between the outer ring and the intermediary ring, the first magnetic core comprising a second material having a second CTE, wherein the first magnetic core is split into a plurality of sections separated by spaces, wherein each of the plurality of sections is separately coupled to the mounting structure, and wherein each of the plurality of sections is connected to a first electrical component; and
    a second magnetic core coupled to the mounting structure between the intermediary ring and the inner ring, the second magnetic core comprising the second material having the second CTE, wherein the second magnetic core is connected to a second electrical component.

2. The device of claim 1, wherein, during first thermal conditions, the plurality of sections are separated by a first distance and, during second thermal conditions, the plurality of sections are separated by a second distance that is different from the first distance.

3. The device of claim 2, wherein the plurality of sections are aligned with a center point of the mounting structure such that, during the first thermal conditions and during the second thermal conditions, an outer edge of each section is substantially equidistant from the center point.

4. The device of claim 3, further comprising a stationary portion and a rotating portion, wherein the mounting structure corresponds to the stationary portion of the device, and wherein the rotating portion is configured to rotate along an axis that is aligned with the center point of the magnetic core.

5. The device of claim 1, wherein the first electrical component comprises a first winding of a first transformer and the second electrical component comprises a second winding of a second transformer.

6. The device of claim 5, wherein the first winding of the first transformer is configured to expand with increased temperature such that the first winding spans the spaces between the plurality of sections as the spaces expand with increased temperature.

7. The device of claim 1, wherein each magnetic core is circular.

8. The device of claim 1, wherein the mounting structure comprises aluminum and each magnetic core comprises a ceramic material.

9. The device of claim 1, further comprising an intermediate film disposed between the mounting structure and the magnetic cores, wherein the intermediate film is configured to contain one or more broken pieces of the magnetic cores.

10. The device of claim 1, wherein the device comprises a LIDAR device having a stationary portion and a rotating portion, and wherein the magnetic cores are coupled to the stationary portion of the LIDAR device.

11. The device of claim 1, wherein the base is configured to expand or contract in response to changing thermal conditions thereby changing a size of the spaces separating the plurality of sections of the first magnetic core.

12. The devices of claim 1, wherein the first magnetic core has a first height, and wherein the second magnetic core has a second height that is different from the first height.

13. The device of claim 1, wherein the outer ring expands more than the intermediary ring when each are subjected to an elevated temperature, and wherein the intermediary ring expands more than the inner ring when each are subjected to the elevated temperature.

14. The device of claim 1, wherein a pliable adhesive couples the first magnetic core to the base.

15. The device of claim 1, wherein a size of each of the spaces between the plurality of sections of the first magnetic core is dependent on the first CTE and the second CTE.

16. A light ranging and detection (LIDAR) device comprising:
    a first end comprising a first side of a transformer pair, wherein the first side of the transformer pair is configured to transfer power to a second side of the transformer pair; and
    a second end comprising:
        a plurality of light emitters;
        a plurality of light detectors; and
        the second side of the transformer pair, wherein the second side of the transformer pair is configured to power the plurality of light emitters and the plurality of light detectors by way of the first side of the transformer pair,
    wherein the first side of the transformer pair and the second side of the transformer pair each comprises:
        a mounting structure comprising a first material having a first coefficient of thermal expansion (CTE), wherein the mounting structure comprises:
            an outer ring;
            an intermediary ring; and
            an inner ring;
        a first magnetic core coupled to the mounting structure between the outer ring and the intermediary ring, the first magnetic core comprising a second material having a second CTE, wherein the first magnetic core is split into a plurality of sections separated by spaces, wherein each of the plurality of sections is separately coupled to the mounting structure, and wherein each of the plurality of sections is connected to a first electrical component; and a second magnetic core coupled to the mounting structure between the intermediary ring and the inner ring, the second magnetic core comprising the second material having the second CTE, wherein the second magnetic core is connected to the second electrical component.

17. The LIDAR device of claim 16, wherein, during first thermal conditions, the plurality of sections are separated by a first distance and, during second thermal conditions, the plurality of sections are separated by a second distance that is different from the first distance.

18. The LIDAR device of claim 17, wherein the plurality of sections are aligned with a center point of the mounting structure such that, during the first thermal conditions and during the second thermal conditions, an outer edge of each section is substantially equidistant from the center point.

19. The LIDAR device of claim 18, wherein the first end is stationary and wherein the second end is configured to rotate along an axis that is aligned with the center point of the mounting structure.

20. A transformer comprising:
a first side of a transformer pair and a second side of the transformer pair, wherein the first side is configured to transfer power to the second side, and wherein the first side of the transformer pair and the second side of the transformer pair each comprises:
a mounting structure comprising a first material having a first coefficient of thermal expansion (CTE), wherein the mounting structure comprises:
an outer ring;
an intermediary ring; and
an inner ring;
a first magnetic core coupled to the mounting structure between the outer ring and the intermediary ring, the first magnetic core comprising a second material having a second CTE, wherein the first magnetic core is split into a plurality of sections separated by spaces, wherein each of the plurality of sections is separately coupled to the mounting structure, and wherein each of the plurality of sections is connected to a first electrical component;
a second magnetic core coupled to the mounting structure between the intermediary ring and the inner ring, the second magnetic core comprising the second material having the second CTE, wherein the second magnetic core comprises one section that is connected to the second electrical component; and
a first winding connected to the first magnetic core and a second winding connected to the second magnetic core.

* * * * *